(12) United States Patent
Suwa

(10) Patent No.: US 12,439,371 B2
(45) Date of Patent: Oct. 7, 2025

(54) INFORMATION PROCESSING SYSTEM, INFORMATION PROCESSING METHOD, AND NON-TRANSITORY COMPUTER READABLE MEDIUM

(71) Applicant: TOYOTA JIDOSHA KABUSHIKI KAISHA, Toyota (JP)

(72) Inventor: Nobutoshi Suwa, Komae (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 317 days.

(21) Appl. No.: 18/086,043

(22) Filed: Dec. 21, 2022

(65) Prior Publication Data
US 2023/0199706 A1 Jun. 22, 2023

(30) Foreign Application Priority Data
Dec. 22, 2021 (JP) .................................. 2021-208776

(51) Int. Cl.
*H04W 64/00* (2009.01)
(52) U.S. Cl.
CPC ....... *H04W 64/006* (2013.01); *H04W 64/003* (2013.01)
(58) Field of Classification Search
CPC . H04W 64/006; H04W 64/003; H04W 4/029; H04W 4/80; H04W 12/08; H04W 12/10; H04W 4/60; H04W 36/0055; H04W 4/02; H04W 4/025; H04W 52/0232; H04W 64/00; H04W 8/183; H04W 84/18;
(Continued)

(56) References Cited

U.S. PATENT DOCUMENTS 8,457,354 B1 6/2013 Kolar et al.
9,904,846 B2 2/2018 Kindo et al.
(Continued)

FOREIGN PATENT DOCUMENTS

JP 2002-148349 A 5/2002
JP 2003-100471 A 4/2003
(Continued)

OTHER PUBLICATIONS

Communication dated May 15, 2025, issued in U.S. Appl. No. 18/069,475.

*Primary Examiner* — Nimesh Patel
(74) *Attorney, Agent, or Firm* — Sughrue Mion, PLLC

(57) ABSTRACT

An information processing system includes: a specification apparatus specifying a specific person; a recognition apparatus recognizing an unspecific person present in a geographic range; a first memory storing first data including a time/position at which the specific person is specified; a second memory storing second data including a recognition result by the recognition apparatus; and an information processing apparatus that acquires the first data and the second data; acquires a movement history indicating a temporal change in a position of a first unspecific person by analyzing the second data; determines whether the specific person and the first unspecific person are identical, based on the first data and the movement history of the first unspecific person; and outputs the movement history of the first unspecific person, as a movement history of the specific person, when the specific person and the first unspecific person are determined to be identical.

9 Claims, 13 Drawing Sheets

(58) Field of Classification Search
CPC ..... H04W 4/024; H04W 40/02; H04W 40/20; H04W 72/0453; H04W 4/33; H04W 24/08; H04W 4/70; H04W 12/06; H04W 4/40; H04W 48/04; H04W 8/22; H04W 12/63; H04W 12/68; H04W 4/021; H04W 48/16; H04W 48/18; H04W 28/0268; H04W 36/0009; H04W 4/08; H04W 4/44; H04W 4/46; H04W 74/0816; H04W 84/005; G06V 40/10; G06V 20/64; G06V 40/161; G06V 40/168; G06V 40/172; G06V 40/171; G06V 40/197; G06V 40/45; G06V 10/70; G06V 10/776; G06V 20/56; G06V 40/70; G06V 20/52; G06V 40/103; G06V 10/12; G06V 10/44; G06V 40/20; G06V 40/23; G06V 10/761; G06V 10/94; G06V 2201/07; G01S 13/06; G01S 13/56; G01S 13/886; G01S 7/415; G01S 1/026; G01S 13/003; G01S 13/04; G01S 13/66; G01S 13/50; G01S 13/765; G01S 13/887; G01S 2205/006; G01S 2205/008; G01S 5/0009; G01S 5/0018; G01S 5/0054; G01S 5/06; G01S 7/417; G01S 7/41; G01S 13/867; G01S 5/02; G01S 13/62; G01S 13/72; G01S 17/66; G01S 2013/462; G01S 5/017; B60W 2556/10; B60W 2050/0014; B60W 2050/0075; B60W 50/085; B60W 2050/143; B60W 2540/043; B60W 2552/05; B60W 2555/20; B60W 2555/60; B60W 2556/50; G08G 1/20; G08G 1/0129; G08G 1/052; G08G 1/123; G08G 1/127; G08G 1/16; G08G 1/202; G08G 1/01; G08G 1/205; G08G 1/0104; G08G 1/0133; G08G 1/0141; G08B 13/2491; G08B 29/18; G08B 13/00; G08B 13/1427; G08B 13/2454; G08B 13/19; G08B 13/19697; G06T 7/70; G06T 7/20; G06T 7/00; G06T 2207/10016; G06T 2207/30196; G06T 7/246; G06T 2207/30252; G06T 5/50; G06T 7/251; G06T 7/292; G06T 7/73; G06T 7/80; G06T 2207/30232; G06T 7/0012; G06T 7/0016; G06T 2207/30241; G06T 2200/28; G06T 2207/10048; G06T 2207/20081; G06T 2207/20084; G06T 7/55; G06T 2207/30004; G06T 2207/30201; G06T 5/60; H04L 67/535; H04L 41/147
See application file for complete search history.

(56) References Cited

U.S. PATENT DOCUMENTS

| | | | |
|---|---|---|---|
| 11,354,683 | B1 | 6/2022 | Shin et al. |
| 2009/0005987 | A1* | 1/2009 | Vengroff ............ G06Q 30/0261 705/7.34 |
| 2013/0010095 | A1* | 1/2013 | Aoki ................... H04N 23/611 382/103 |
| 2015/0019161 | A1 | 1/2015 | Moriguchi et al. |
| 2015/0363636 | A1 | 12/2015 | Tate et al. |
| 2018/0068172 | A1* | 3/2018 | Despiegel ............ H04W 12/08 |
| 2018/0239015 | A1 | 8/2018 | Nishida |
| 2019/0026560 | A1* | 1/2019 | Nishikawa ............ G06T 7/246 |
| 2019/0354776 | A1 | 11/2019 | Ribeiro et al. |
| 2020/0193147 | A1 | 6/2020 | Kusama et al. |
| 2021/0174094 | A1 | 6/2021 | Oami |
| 2021/0286040 | A1 | 9/2021 | Morishita et al. |
| 2023/0196818 | A1 | 6/2023 | Suwa |

FOREIGN PATENT DOCUMENTS

| | | |
|---|---|---|
| JP | 2003-274389 A | 9/2003 |
| JP | 2005-346545 A | 12/2005 |
| JP | 2010-108037 A | 5/2010 |
| JP | 2012-073915 A | 4/2012 |
| JP | 2015-069452 A | 4/2015 |
| JP | 2018-13851 | 1/2018 |
| JP | 2018-136240 A | 8/2018 |
| JP | 2019-144941 A | 8/2019 |
| JP | 2020-091174 A | 6/2020 |
| WO | 2013/128852 A1 | 9/2013 |
| WO | 2019/239471 A1 | 12/2019 |

* cited by examiner

FIG. 10

| TIME | POSITION | INDIVIDUAL IDENTIFICATION INFORMATION |
|---|---|---|
| 14:50:00 | (60, 60) | USER A |
| 15:35:00 | (60, 60) | USER B |
| ... | ... | ... |

FIG. 11

| RECOGNITION APPARATUS | OBJECT ID | TIME | POSITION |
|---|---|---|---|
| . . | . . | . . . | . . |
| 30b | b0001 | 14:51:29 | (51.5, 60) |
| 30b | b0001 | 14:51:30 | (50, 60) |
| . . | . . | . . . | . . . |
| 30c | c0001 | 14:51:59 | (120, 119) |
| 30c | c0001 | 14:52:00 | (120, 120) |
| . . . | . . | . . . | . . . |

FIG. 12

| TIME | POSITION | VELOCITY VECTOR |
|---|---|---|
| 14:50:00 | (60, 60) | (60, 0) |
| 14:50:40 | (120, 140) | (0, -70) |
| 14:51:00 | (120, 60) | (60, 0) |
| 14:51:30 | (50, 60) | (-90, 0) |
| 14:52:00 | (120, 120) | (0, 60) |
| 14:53:00 | (120, 70) | (0, 70) |
| ... | ... | ... |

FIG. 13

| TIME | POSITION | VELOCITY VECTOR |
|---|---|---|
| 14:50:00 | (60, 60) | (60, 0) |
| 14:51:00 | (120, 60) | (60, 0) |
| 14:52:00 | (120, 120) | (0, 60) |
| . . . | . . . | . . |

INFORMATION PROCESSING SYSTEM, INFORMATION PROCESSING METHOD, AND NON-TRANSITORY COMPUTER READABLE MEDIUM

CROSS-REFERENCE TO RELATED APPLICATION

This application claims priority to Japanese Patent Application No. 2021-208776 filed on Dec. 22, 2021, the entire contents of which are incorporated herein by reference.

TECHNICAL FIELD

The present disclosure relates to an information processing system, an information processing method, and a non-transitory computer readable medium.

BACKGROUND

Technology for tracking individual behavior is known. For example, Patent Literature (PTL) 1 discloses technology for tracking individual behavior using information indicating personal character and conduct.

CITATION LIST

Patent Literature

PTL 1: JP 2010-108037 A

SUMMARY

However, there is room for improvement with respect to technology for tracking individual behavior.

It would be helpful to improve technology for tracking individual behavior.

An information processing system according to an embodiment of the present disclosure includes:
  a specification apparatus configured to specify a person present at a predetermined position as a specific person;
  at least one recognition apparatus configured to recognize a person present in a geographic range corresponding to the respective recognition apparatus as an unspecific person;
  a first memory apparatus configured to store first data including a time and the predetermined position at which the specification apparatus has specified the specific person;
  a second memory apparatus configured to store second data including a result of recognition by the at least one recognition apparatus; and
  an information processing apparatus configured to:
  acquire the first data from the first memory apparatus and the second data from the second memory apparatus;
  acquire a movement history indicating a temporal change in a position of a first unspecific person by analyzing the second data;
  determine whether the specific person and the first unspecific person are identical, based on the first data and the movement history of the first unspecific person; and
  output the movement history of the first unspecific person, as a movement history of the specific person, in a case in which the specific person and the first unspecific person are determined to be identical.

An information processing method according to an embodiment of the present disclosure is an information processing method of an information processing system including:
  a specification apparatus configured to specify a person present at a predetermined position as a specific person;
  at least one recognition apparatus configured to recognize a person present in a geographic range corresponding to the respective recognition apparatus as an unspecific person;
  a first memory apparatus configured to store first data including a time and the predetermined position at which the specification apparatus has specified the specific person;
  a second memory apparatus configured to store second data including a result of recognition by the at least one recognition apparatus; and
  an information processing apparatus,
  the information processing method including:
  acquiring the first data from the first memory apparatus and the second data from the second memory apparatus;
  acquiring a movement history indicating a temporal change in a position of a first unspecific person by analyzing the second data;
  determining whether the specific person and the first unspecific person are identical, based on the first data and the movement history of the first unspecific person; and
  outputting the movement history of the first unspecific person, as a movement history of the specific person, in a case in which the specific person and the first unspecific person are determined to be identical.

An non-transitory computer readable medium according to an embodiment of the present disclosure stores a program configured to cause a computer to execute operations as an information processing apparatus configured to communicate with a specification apparatus configured to specify a person present at a predetermined position as a specific person, at least one recognition apparatus configured to recognize a person present in a geographic range corresponding to the respective recognition apparatus as an unspecific person, a first memory apparatus configured to store first data including a time and the predetermined position at which the specification apparatus has specified the specific person, and a second memory apparatus configured to store second data including a result of recognition by the at least one recognition apparatus, the operations including:
  acquiring the first data from the first memory apparatus and the second data from the second memory apparatus;
  acquiring a movement history indicating a temporal change in a position of a first unspecific person by analyzing the second data;
  determining whether the specific person and the first unspecific person are identical, based on the first data and the movement history of the first unspecific person; and
  outputting the movement history of the first unspecific person, as a movement history of the specific person, in a case in which the specific person and the first unspecific person are determined to be identical.

According to an embodiment of the present disclosure, technology for tracking individual behavior is improved.

BRIEF DESCRIPTION OF THE DRAWINGS

In the accompanying drawings:

FIG. 10 is a drawing illustrating an example of a sample of first data stored in a first memory apparatus;

FIG. 11 is a drawing illustrating an example of a sample of second data stored in a second memory apparatus;

FIG. 12 is a drawing illustrating an example of velocity vectors determined based on the second data; and FIG. 13 is a drawing illustrating an example of a movement history extracted from results of recognition by the recognition apparatus.

DETAILED DESCRIPTION

Hereinafter, an embodiment of the present disclosure will be described.

Outline of Embodiment

Figure 1:
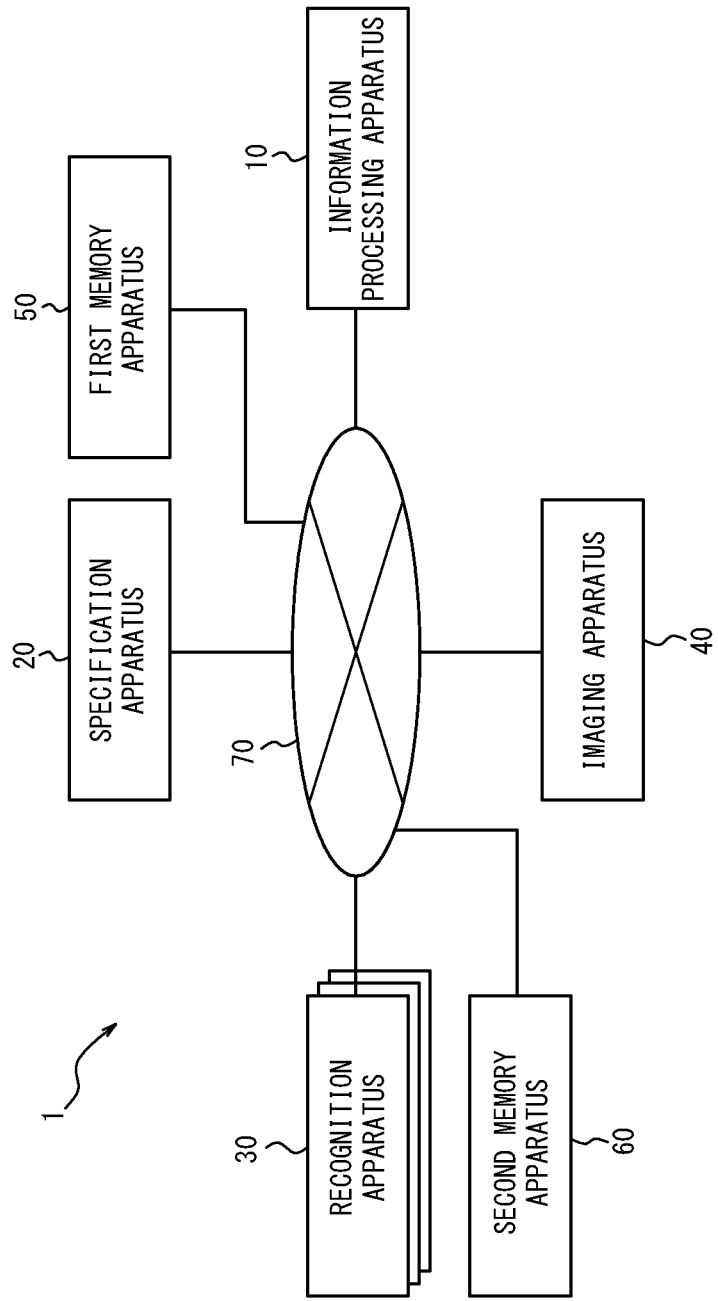
FIG. 1 is a block diagram illustrating a schematic configuration of an information processing system according to an embodiment of the present disclosure.

With reference to FIG. 1, an information processing system 1 according to the embodiment of the present disclosure will be described. The information processing system 1 includes an information processing apparatus 10, a specification apparatus 20, at least one recognition apparatus 30, an imaging apparatus 40, a first memory apparatus 50, and a second memory apparatus 60. The information processing apparatus 10, the specification apparatus 20, the at least one recognition apparatus 30, the imaging apparatus 40, the first memory apparatus 50, and the second memory apparatus 60 are communicably connected to a network 70 including, for example, the Internet, a mobile communication network, and the like. The following describes an example in which the numbers of the information processing apparatus 10, the specification apparatus 20, the imaging apparatus 40, the first memory apparatus 50, and the second memory apparatus 60 in the information processing system 1 are all one, but the number of at least any of these apparatuses may be two or more. The specification apparatus 20 and the at least one imaging apparatus 40 are installed, for example, in a certain geographic area such as in a town, on a specific site, or in a building. The following describes an example in which the specification apparatus 20 and the at least one imaging apparatus 40 are installed in a town, but these apparatuses may be installed in a desired geographic area.

The information processing apparatus 10 is, for example, a computer such as a server apparatus. The information processing apparatus 10 can communicate with the imaging apparatus 40, the first memory apparatus 50, and the second memory apparatus 60 via the network 70.

The specification apparatus 20 is an apparatus that specifies a person present at a predetermined position as a specific person and acquires identification information identifying the person. The specification apparatus 20 may specify the person, for example, by receiving data such as a user identify (ID) from a terminal in the possession of the person or by reading the person's biological information.

The recognition apparatus 30 is an apparatus that recognizes a person present in a geographic range corresponding to the respective recognition apparatus as an unspecific person. The recognition apparatus 30 can recognize a position of the person present in the geographic range corresponding to the respective recognition apparatus. The recognition apparatus 30 may recognize the person, for example, by millimeter wave radar or an infrared sensor. As described below, a result of recognition of the unspecific person by the recognition apparatus 30 may be used to extract a movement history of the unspecific person.

The imaging apparatus 40 is an apparatus that images a person and acquires a photographic image. The photographic image acquired by the imaging apparatus 40 may be stored in association with a movement history of an unspecific person who has been recognized as a person by the recognition apparatus 30 but has not been specified by the specification apparatus 20.

The specification apparatus 20 may be installed in only one specific location, whereas the at least one recognition apparatus 30 may be installed in at least one location throughout the town. Alternatively, the specification apparatus 20 may be installed only in a public place, whereas the recognition apparatus 30 may be installed in private space as well as in the public place. For example, the specification apparatus 20 may be installed at an entrance of a residential building to specify persons such as residents or visitors entering the residential building. The recognition apparatus 30 may track the persons' behavior after the persons have entered the residential building.

The first memory apparatus 50 is an apparatus that stores, as first data, identification information on a person specified by the specification apparatus 20 and information including a time and position at which the specification apparatus 20 has specified the person. The second memory apparatus 60 is an apparatus that stores, as second data, information including a position of a person recognized by the recognition apparatus 30, a time at which the recognition apparatus 30 has recognized the person, and a velocity vector. The velocity vector may be determined, for example, by the information processing apparatus 10 analyzing a result of recognition by the recognition apparatus 30. The first memory apparatus 50 and the second memory apparatus 60 may be realized, for example, by network storage. Alternatively, the first memory apparatus 50 or the second memory apparatus 60 may be realized by storage built in or external to the information processing apparatus 10. Alternatively, the first memory apparatus 50 may be realized by storage that is built in or external to the specification apparatus 20 and is accessible from the information processing apparatus 10. The second memory apparatus 60 may be realized by distributed storage that is built in or external to the respective at least one recognition apparatus 30 and is accessible from the information processing apparatus 10.

First, an outline of the present embodiment will be described, and details thereof will be described later. In the above configuration, the information processing apparatus 10 acquires the first data from the first memory apparatus 50 and the second data from the second memory apparatus 60. The information processing apparatus 10 acquires a movement history indicating a temporal change in the position of a first unspecific person by analyzing the second data. The information processing apparatus 10 determines whether the specific person and the first unspecific person are identical, based on the first data and the movement history of the first unspecific person. In a case in which the specific person and the first unspecific person are determined to be identical, the information processing apparatus 10 outputs the movement history of the first unspecific person as a movement history of the specific person.

Thus, the information processing system 1 according to the present embodiment stores the first data including a person's identification information and the second data including a pair of time and position of an unspecific person in the separate memory apparatuses. Therefore, even if a malicious third party illegally acquires either the first data or the second data, the movement history of the specific person cannot be acquired, thus protecting that person's privacy. In addition, in a case in which the specific person and the first unspecific person are determined to be identical, the information processing apparatus 10 outputs the movement history of the first unspecific person as the movement history of the specific person, so that a user can easily grasp the correspondence relationship between the movement history and the specific person. The information processing system 1 associates the specific person with the movement history, based on the result of specification by the specification apparatus 20 and the movement history of the unspecific person based on the result of recognition by the at least one recognition apparatus 30. Therefore, the information processing system 1 can specify the unspecific person recognized by the recognition apparatus 30. The movement history is acquired without specifying a person, the person's privacy can be protected. On the other hand, for a person (e.g., a resident of the town) who can be specified by the specification apparatus 20, a movement history can be stored in association with the person (in other words, a movement history can be stored in a format that can specify the individual), which is useful, for example, from the viewpoint of crime prevention or security. Also, the information processing system 1 can acquire a movement history over a wide geographic area by using the at least one recognition apparatus 30. According to the present embodiment, the number of the expensive specification apparatuses 20 can be reduced, thus lowering cost. Furthermore, according to the present embodiment, an individual cannot be specified only from a result of recognition by the recognition apparatus 30, so even if the result of recognition leaks, privacy can be protected. Thus, the present embodiment improves technology for tracking individual behavior in terms of reducing cost of system construction and protecting privacy.

Next, configurations of the information processing system 1 will be described in detail.

(Configuration of Information Processing Apparatus)

Figure 2:
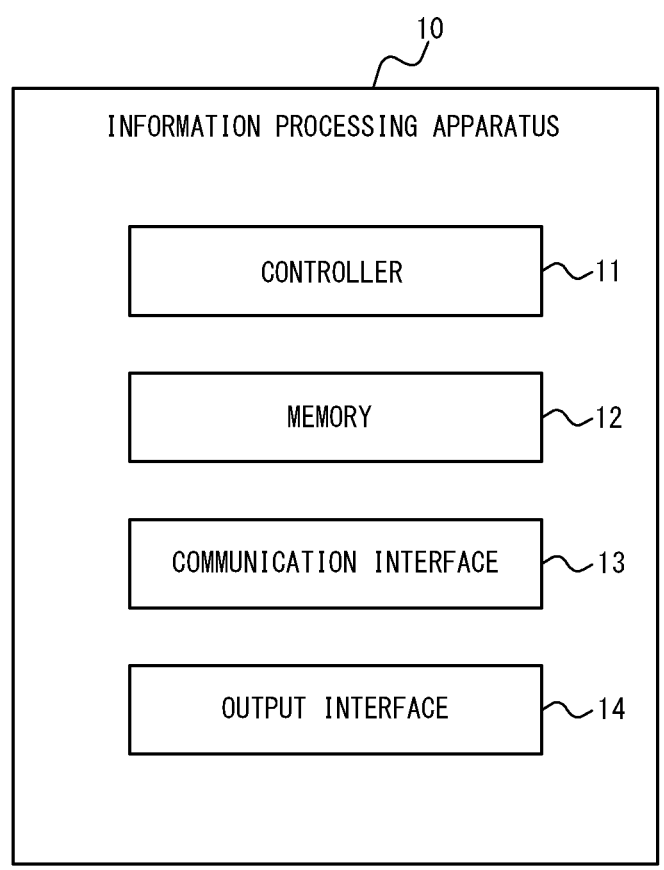
FIG. 2 is a block diagram illustrating a schematic configuration of an information processing apparatus.

As illustrated in FIG. 2, the information processing apparatus 10 includes a controller 11, a memory 12, a communication interface 13, and an output interface 14.

The controller 11 includes at least one processor, at least one programmable circuit, at least one dedicated circuit, or a combination of these. The processor is a general purpose processor such as a central processing unit (CPU) or a graphics processing unit (GPU), or a dedicated processor that is dedicated to specific processing, for example, but is not limited to these. The programmable circuit is a field-programmable gate array (FPGA), for example, but is not limited to this. The dedicated circuit is an application specific integrated circuit (ASIC), for example, but is not limited to this. The controller 11 controls operations of the entire information processing apparatus 10.

The memory 12 includes one or more memories. The memories are semiconductor memories, magnetic memories, optical memories, or the like, for example, but are not limited to these. The memories included in the memory 12 may each function as, for example, a main memory, an auxiliary memory, or a cache memory. The memory 12 stores any information used for operations of the information processing apparatus 10. For example, the memory 12 may store a system program, an application program, a database, map information, or the like. The information stored in the memory 12 may be updated with, for example, information acquired from the network 70 via the communication interface 13.

The communication interface 13 includes at least one interface for communication for connecting to the network 70. The interface for communication is compliant with mobile communication standards such as the 4th generation (4G) standard and the 5th generation (5G) standard, a wired local area network (LAN) standard, or a wireless LAN standard, for example, but not limited to these, and may be compliant with any communication standard. In the present embodiment, the information processing apparatus 10 can communicate with the specification apparatus 20, the at least one recognition apparatus 30, the imaging apparatus 40, the first memory apparatus 50, and the second memory apparatus 60 via the communication interface 13 and the network 70. The information processing apparatus 10 may communicate via the communication interface 13 and the network 70, for example, with an apparatus other than the specification apparatus 20, the at least one recognition apparatus 30, the imaging apparatus 40, the first memory apparatus 50, and the second memory apparatus 60, such as a smartphone in the possession of a person.

The output interface 14 includes at least one output interface for outputting information to notify a user of the information. For example, the output interface 14 can be a display, Light Emitting Diode (LED), speaker, vibrator, or the like that outputs the information through image display, but is not limited to these.

(Configuration of Specification Apparatus)

Figure 3:
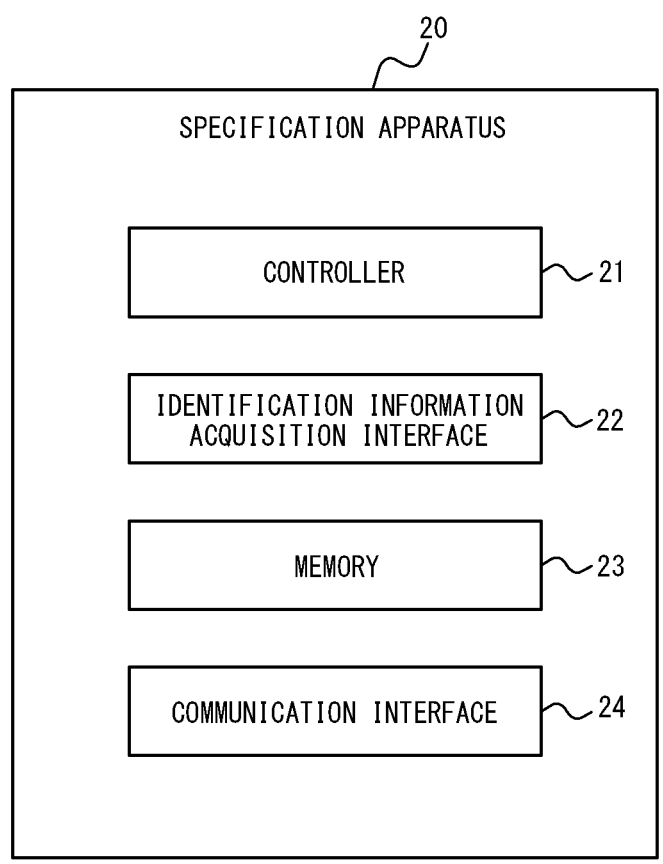
FIG. 3 is a block diagram illustrating a schematic configuration of a specification apparatus.

As illustrated in FIG. 3, the specification apparatus 20 includes a controller 21, an identification information acquisition interface 22, a memory 23, and a communication interface 24.

The controller 21 includes at least one processor, at least one programmable circuit, at least one dedicated circuit, or a combination of these. The controller 21 controls operations of the entire specification apparatus 20.

The identification information acquisition interface 22 is an apparatus that specifies a person present at a predetermined position and acquires identification information identifying the person. The identification information acquisition interface 22 may, for example, specify an individual who holds a terminal by receiving data, such as a user ID, from the terminal held by the person. Such a terminal is, for example, a smartphone, but may be an employee ID card, an entrance card, or the like. When the person is specified using the held terminal, the identification information acquisition interface 22 may communicate with the terminal using a wireless communication method such as, for example, Bluetooth® (Bluetooth is registered trademark in Japan, other countries, or both) or Near Field Communication (NFC). In communication by the Bluetooth®, the identification information acquisition interface 22 can identify terminals every 10 centimeters, so that multiple persons can be specified simultaneously. The identification information acquisition interface 22 may, for example, directly acquire biological information on a person's fingerprint, iris, face, or the like and specify the person using the biological information itself or information specifying the person corresponding to the biological information as identification information. In other words, the identification information acquisition interface 22 may include a camera or biometric sensor.

The memory 23 includes one or more memories. The memories included in the memory 23 may each function as, for example, a main memory, an auxiliary memory, or a cache memory. The memory 23 stores any information to be used for operations of the specification apparatus 20. For example, the memory 23 may store a system program, an application program, a database, map information, and the like. The information stored in the memory 23 may be updated with, for example, information acquired from the network 70 via the communication interface 24.

The communication interface 24 includes at least one interface for communication for connecting to the network 70. The interface for communication is compliant with, for example, a mobile communication standard, a wired LAN standard, or a wireless LAN standard, but not limited to these, and may be compliant with any communication standard. In the present embodiment, the specification apparatus 20 can communicate with the information processing apparatus 10 and the first memory apparatus 50 via the communication interface 24 and the network 70.

When the identification information acquisition interface 22 acquires identification information on a person present at a predetermined position, the controller 21 of the specification apparatus 20 controls the first memory apparatus 50 to store, as first data, the identification information and information including a position and time at which the identification information has been acquired. In other words, the controller 21 transmits the first data from the communication interface 24 to the first memory apparatus 50 via the network 70 and controls the first memory apparatus 50 to store the first data. The controller 21 may communicate with the first memory apparatus 50 via a secure communication channel, such as an encrypted communication channel. This prevents leakage of the information on the behavior of the person specified by the specification apparatus 20, thereby protecting the person's privacy.

(Configuration of Recognition Apparatus)

Figure 4:
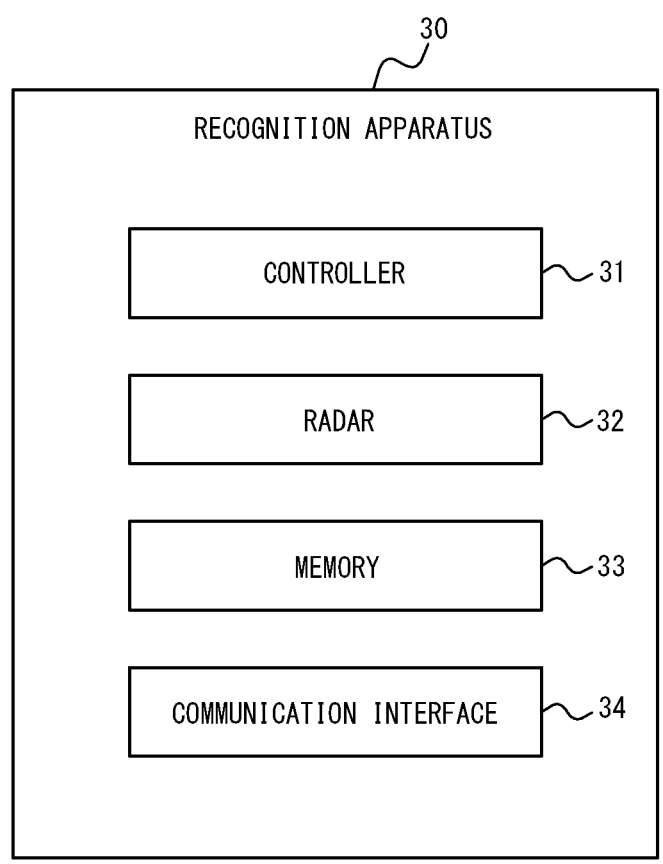
FIG. 4 is a block diagram illustrating a schematic configuration of a recognition apparatus.

As illustrated in FIG. 4, the recognition apparatus 30 includes a controller 31, radar 32, a memory 33, and a communication interface 34.

The controller 31 includes at least one processor, at least one programmable circuit, at least one dedicated circuit, or a combination of these. The controller 31 controls operations of the entire recognition apparatus 30.

The radar 32 is an apparatus that transmits millimeter waves to a geographic range corresponding to the recognition apparatus 30 and receives reflected waves thereof. When an object such as a person is present in the corresponding geographic range, the object reflects the millimeter waves. The recognition apparatus 30 recognizes the object based on the reflected waves from the object, received by the radar 32. In the present embodiment, in a case in which a moving object is recognized, the recognition apparatus 30 recognizes the object as an unspecific person. The radar 32 may, for example, recognize objects in a 50 cm×50 cm to several meters×several meters grid in a geographic range from several meters×several meters to several tens of meters×several tens of meters. Furthermore, the radar 32 may be able to recognize a three-dimensional position of the object. For example, in a case in which the recognition apparatus 30 is installed, for example, at 2.4 m above a floor, the recognition apparatus 30 may be able to recognize the height of the object in a range from the floor to 2.4 m above the floor, in the corresponding geographic range.

The present embodiment describes an example in which the recognition apparatus 30 is realized by millimeter wave radar, but the recognition apparatus 30 is not limited to a configuration based on the millimeter wave radar as long as the recognition apparatus 30 can recognize an unspecific person present in a geographic range corresponding to the recognition apparatus 30 itself. For example, the recognition apparatus 30 may be configured using an infrared sensor or the like. The recognition apparatus 30 can be provided at lower cost than the specification apparatus 20 by using the millimeter wave radar or infrared sensor.

The memory 33 includes one or more memories. The memories included in the memory 33 may each function as, for example, a main memory, an auxiliary memory, or a cache memory. The memory 33 stores any information to be used for operations of the recognition apparatus 30. For example, the memory 33 may store a system program, an application program, a database, map information, and the like. The information stored in the memory 33 may be updated with, for example, information acquired from the network 70 via the communication interface 34.

The communication interface 34 includes at least one interface for communication for connecting to the network 70. The interface for communication is compliant with, for example, a mobile communication standard, a wired LAN standard, or a wireless LAN standard, but not limited to these, and may be compliant with any communication standard. In the present embodiment, the recognition apparatus 30 can communicate with the information processing apparatus 10 and the second memory apparatus 60 via the communication interface 34 and the network 70.

When the radar 32 recognizes an unspecific person present in a geographic range corresponding to the recognition apparatus 30, the controller 31 of the recognition apparatus 30 controls the second memory apparatus 60 to store, as second data, information including a time and position at which the unspecific person has been recognized. In other words, the controller 31 transmits the second data from the communication interface 34 to the second memory apparatus 60 via the network 70 and controls the second memory apparatus 60 to store the second data. The controller 31 may communicate with the second memory apparatus 60 via a secure communication channel, such as an encrypted communication channel. This prevents leakage of the information on the behavior of the unspecific person recognized by the recognition apparatus 30, thereby protecting the person's privacy.

In a case in which not only the position and time but also other information on the unspecific person can be acquired, the controller 31 of the recognition apparatus 30 may control the second memory apparatus 60 to store the information as second data. For example, the controller 31 may determine a velocity vector of the unspecific person based on a temporal change in the position of the unspecific person present in the geographic range corresponding to the recognition apparatus 30. In a case in which the velocity vector is obtained, the controller 31 may control the second memory apparatus 60 to store, as second data, information including the velocity vector, in addition to the time and position at which the unspecific person has been recognized. In a case in which unspecific persons are recognized at proximate times and proximate positions, the controller 31 may recognize that the unspecific persons are identical. For example, when objects are recognized at a fixed frame interval (for example, 0.1 second), in a case in which a distance between a position of an unspecific person recognized in a frame and a position of an unspecific person recognized in a frame adjacent to the frame is equal to or less than a predetermined threshold (for example, 1 m), the unspecific persons may be recognized to be identical. In a case in which the unspecific persons who have been recognized at different times at different positions are recognized to be identical, the controller 31 may assign an object ID to the unspecific person to identify the unspecific person from other unspecific persons. The controller 31 may control the second memory apparatus 60 to store such an object ID as second data. The controller 31 may also control the second memory apparatus 60 to store, as second data, identification information identifying the recognition apparatus 30.

(Configuration of Imaging Apparatus)

Figure 5:
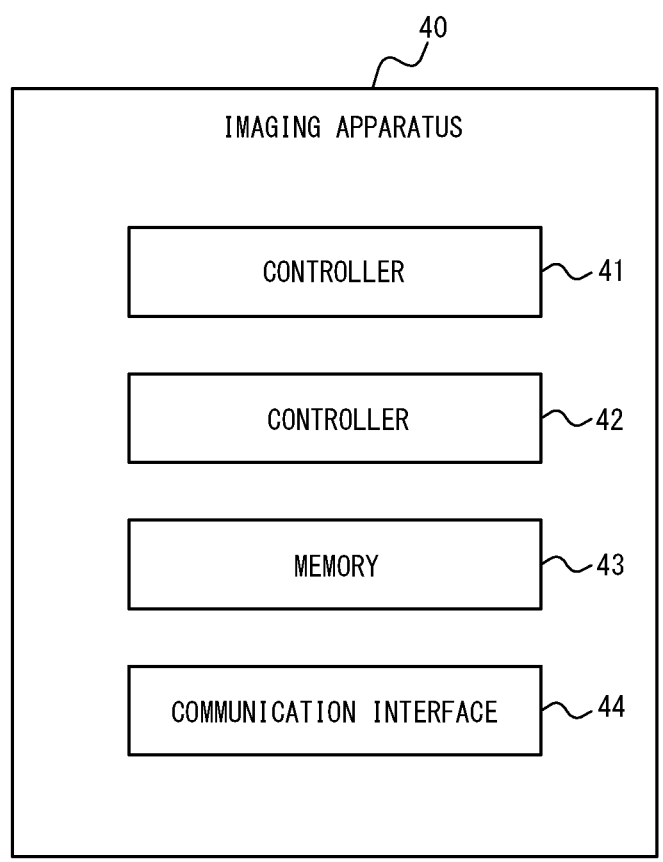
FIG. 5 is a block diagram illustrating a schematic configuration of an imaging apparatus.

As illustrated in FIG. 5, the imaging apparatus 40 includes a controller 41, an imaging interface 42, a memory 43, and a communication interface 44.

The controller 41 includes at least one processor, at least one programmable circuit, at least one dedicated circuit, or a combination of these. The controller 41 controls operations of the entire imaging apparatus 40.

The imaging interface 42 is an apparatus that images an object in a shooting range of the imaging apparatus 40 and generates photographic images. The imaging interface 42 is, for example, an RGB (Red Green Blue) camera that generates color images, but may alternatively be a camera that generates grayscale or black-and-white images.

The memory 43 includes one or more memories. The memories included in the memory 43 may each function as, for example, a main memory, an auxiliary memory, or a cache memory. The memory 43 stores any information to be used for operations of the imaging apparatus 40. For example, the memory 43 may store a system program, an application program, a database, map information, and the like. The information stored in the memory 43 may be updated with, for example, information acquired from the network 70 via the communication interface 44.

The communication interface 44 includes at least one interface for communication for connecting to the network 70. The interface for communication is compliant with, for example, a mobile communication standard, a wired LAN standard, or a wireless LAN standard, but not limited to these, and may be compliant with any communication standard. In the present embodiment, the imaging apparatus 40 can communicate with the information processing apparatus 10 via the communication interface 44 and the network 70.

When the imaging interface 42 images an object, the controller 41 of the imaging apparatus 40 controls the memory 43 to store, as third data, information including a photographic image, a time, and a position. The controller 41 controls the memory 43 to store the third data for a certain period of time (for example, one week) and to then erase the third data. Upon a request from the information processing apparatus 10, the controller 41 may transmit the photographic image from the communication interface 44 to the information processing apparatus 10 via the network 70. When transmitting the photographic image, the controller 41 may communicate with the information processing apparatus 10 via a secure communication channel, such as an encrypted communication channel. This prevents leakage of information on the behavior of a person imaged by the imaging apparatus 40, thereby protecting the person's privacy. In the present embodiment, the imaging apparatus 40 stores the third data including the photographic image in the memory 43, but may store the third data in a memory apparatus including network storage connected to the network 70 or the like.

(Example of Application of Information Processing System)

Figure 6:
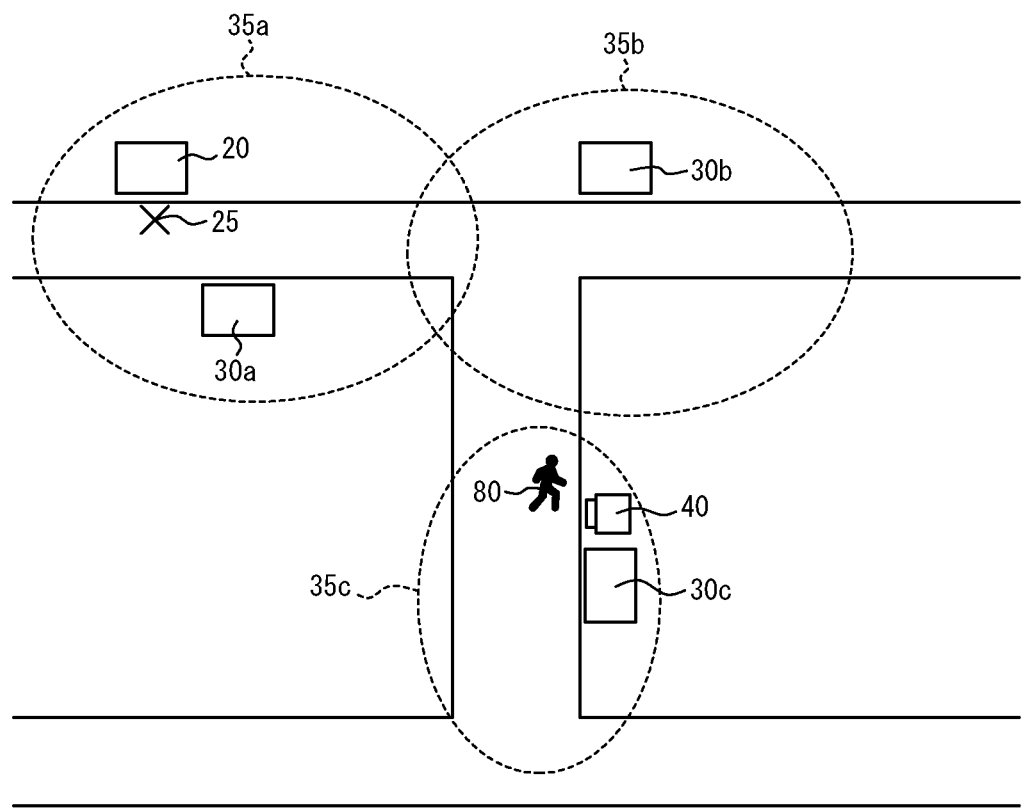
FIG. 6 is a map illustrating an example of an urban area to which the information processing system is applied.

Here describes an example in which the information processing system 1 is applied to an urban area as illustrated in FIG. 6. FIG. 6 is a map illustrating an example of the urban area to which the information processing system 1 is applied. In the example in FIG. 6, one of the specification apparatus 20, three of the recognition apparatuses 30 (30a, 30b, 30c), and one of the imaging apparatus 40 are installed in the vicinity of streets in the urban area.

The specification apparatus 20 specifies a person present at a predetermined position 25 as a specific person. Upon specifying the person, the specification apparatus 20 controls the first memory apparatus 50 to store first data including a time at which the specification apparatus 20 has specified the person, the predetermined position 25, and the person's identification information.

The recognition apparatuses 30 (30a, 30b, 30c) each recognize a person present in geographic ranges 35 (35a, 35b, 35c) corresponding to the respective recognition apparatuses, as an unspecific person. In the example in FIG. 6, the recognition apparatus 30c can recognize a person 80 present in the geographic range 35c. The recognition apparatus 30c acquires a position and time of the recognized person 80 and controls the second memory apparatus 60 to store second data containing this information.

The imaging apparatus 40 images an object present in its own shooting range and generates a photographic image. In the example in FIG. 6, the imaging apparatus 40 constantly images a range almost equal to the geographic range 35c of the recognition apparatus 30c, as its own shooting range.

The following is an example in which an arbitrary point in the map illustrated in FIG. 6 is located by XY coordinates (X,Y) in an XY coordinate system with an origin (reference point) at an upper left of FIG. 6. Here, the value of the X coordinate increases toward the right in FIG. 6. The value of the Y coordinate increases downward in FIG. 6. For example, in FIG. 6, the predetermined position 25 is located at (60,60). The person 80 is located at (120,120). The following is an example in which the values of the X and Y coordinates are numerical values representing distance from the origin in meters (m).

(Flow of Operations of Information Processing Apparatus)

Figure 7:
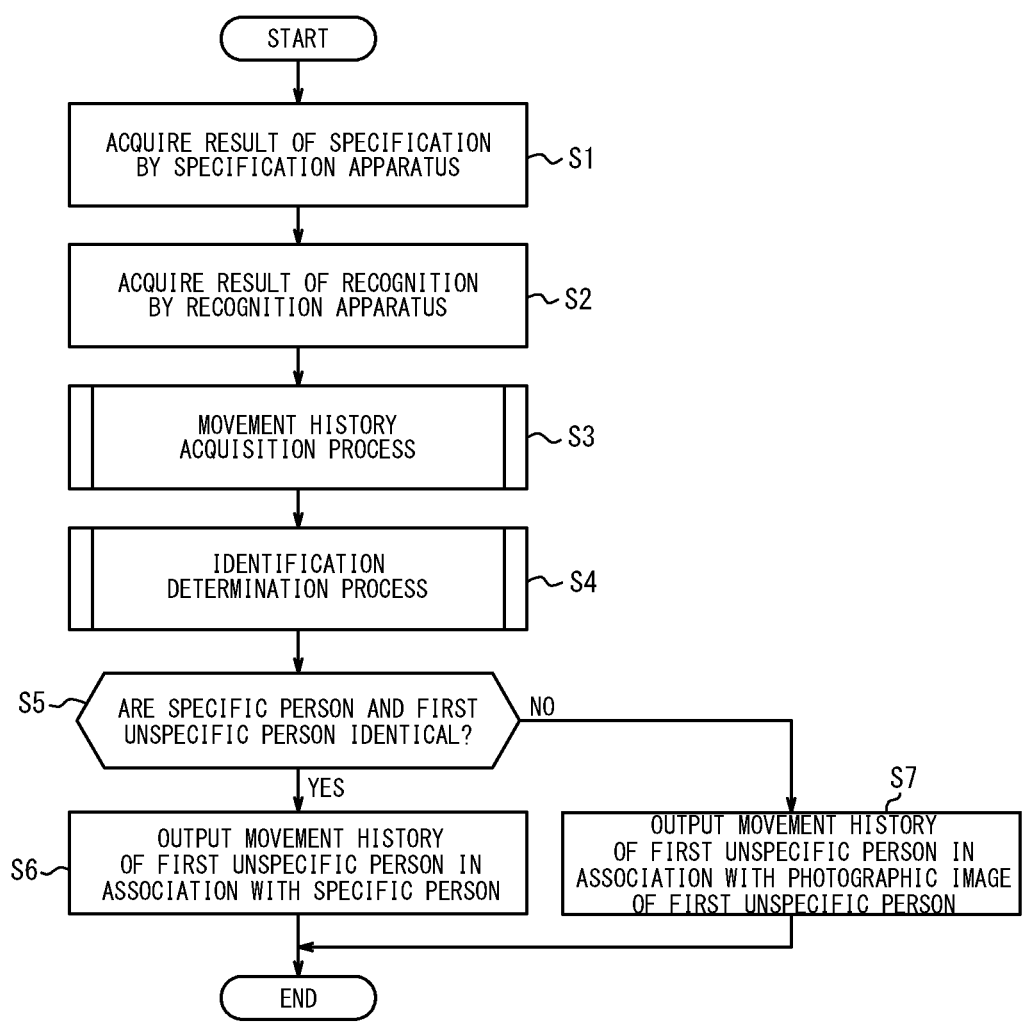
FIG. 7 is a flowchart illustrating operations of the information processing apparatus.
Figure 8:
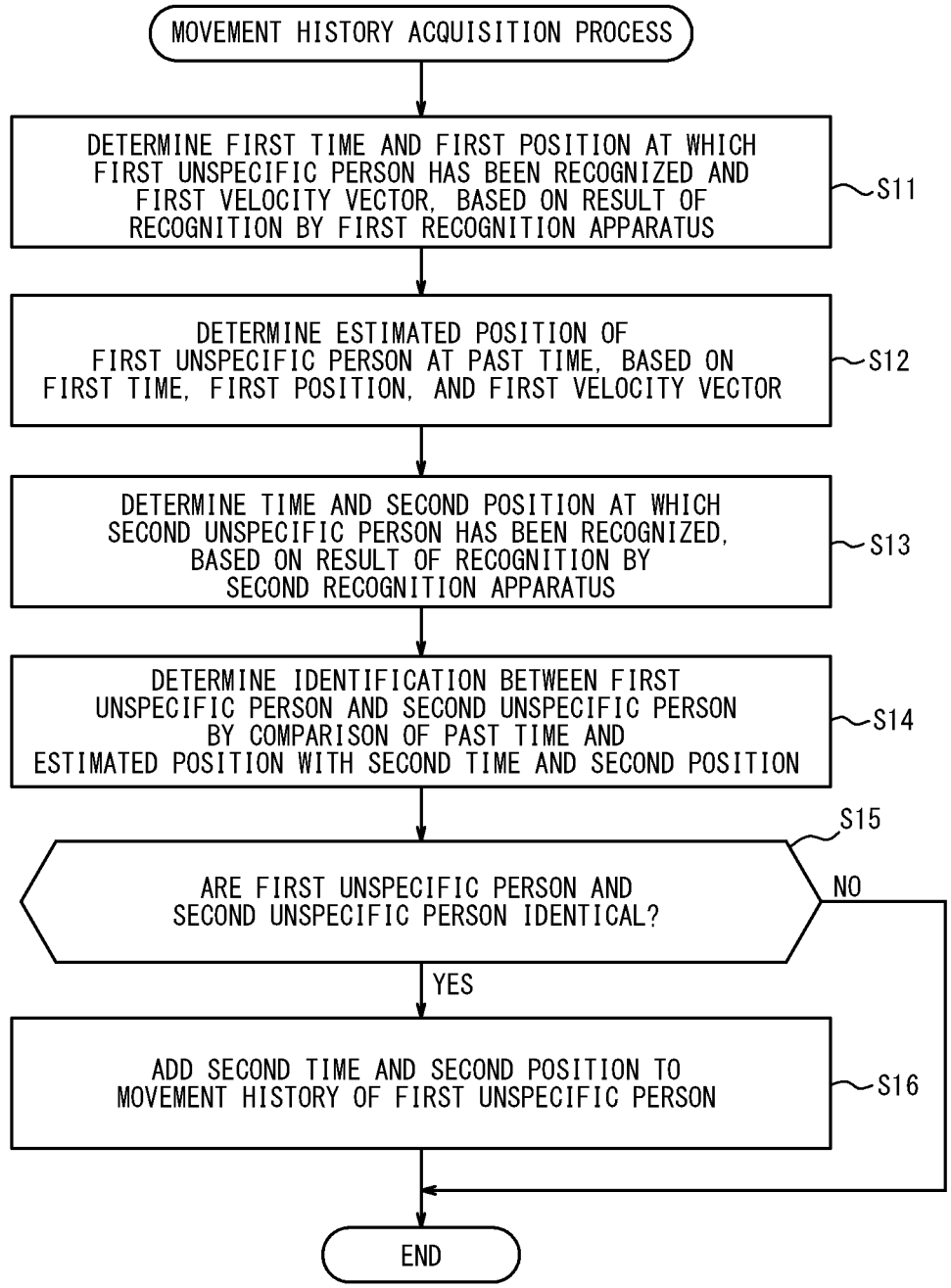
FIG. 8 is a flowchart illustrating a procedure for a movement history acquisition process.
Figure 9:
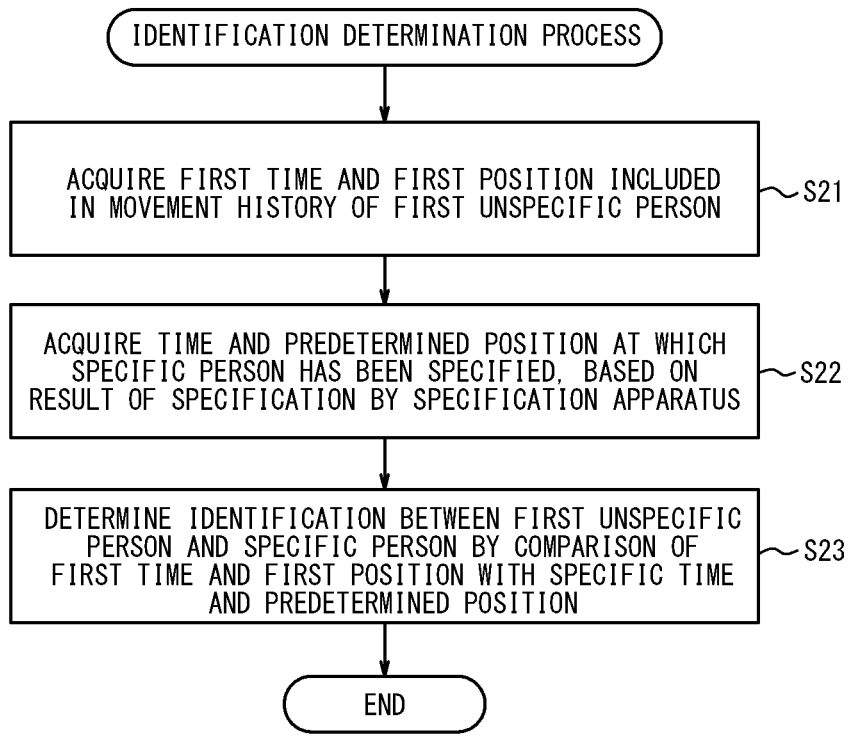
FIG. 9 is a flowchart illustrating a procedure for an identification determination process.

Next, operations of the information processing apparatus 10 will be described with reference to FIGS. 7 to 12. FIGS. 7 to 9 are flowcharts illustrating the operations of the information processing apparatus 10. The operations of the information processing apparatus 10 described with reference to FIGS. 7 to 9 can correspond to one of information processing methods according to the present embodiment. The operation of each step in FIGS. 7 to 9 is performed under the control of the controller 11. A program configured to cause a computer to execute the information processing method according to the present embodiment may include each of the steps illustrated in FIGS. 7 to 9. The following is an example of a process for specifying an unspecific person 80 recognized at a certain time by a certain recognition apparatus (for example, recognition apparatus 30c).

Step S1: The controller 11 acquires a result of specification of a person by the specification apparatus 20.

Specifically, the controller 11 may access the first memory apparatus 50 and refer to first data stored in the first memory apparatus 50. FIG. 10 illustrates an example of a sample of the first data stored in the first memory apparatus 50. In the example in FIG. 10, coordinates of a predetermined position 25 at which the specification apparatus 20 specifies a person are (60,60). In the example in FIG. 10, "user A" is specified at a time 14:50:00 and "user B" is specified at a time 15:35:00 at the predetermined position 25. The following describes a case in which the controller 11 acquires information including the time 14:50:00, the predetermined position (60,60), and the identification information "user A" as a result of specification. In a case in which the first data is stored in the memory 23 of the specification apparatus 20, the controller 11 may access the specification apparatus 20 to acquire the result of specification by the specification apparatus 20.

Step S2: The controller 11 acquires results of recognition of unspecific persons by the respective recognition apparatuses 30 (30a, 30b, and 30c).

Specifically, the controller 11 may access the second memory apparatus 60 and refer to second data stored in the second memory apparatus 60 as the results of recognition of the unspecific persons by the recognition apparatuses 30 (30a, 30b, and 30c). FIG. 11 illustrates an example of a sample of the second data stored in the second memory apparatus 60. In the example in FIG. 11, the results of recognition by all the recognition apparatuses 30 (30a, 30b, and 30c) are stored in chronological order, along with identification information on the recognition apparatuses 30a, 30b, and 30c. For example, in FIG. 11, an unspecific person identified by an object ID "c0001" is recognized at a position (120,119) at a time 14:51:59 and at a position (120,120) at a time 14:52:00 as results of recognition by the recognition apparatus 30c. In a case in which the second data is stored in the memory 33 of each of the recognition apparatuses 30 (30a, 30b, and 30c), the controller 11 may access each of the recognition apparatuses 30 (30a, 30b, and 30c) to acquire the results of recognition by the recognition apparatuses 30 (30a, 30b, and 30c).

The recognition apparatuses 30 (30a, 30b, and 30c) recognize objects (including persons) in the geographic ranges 35 (35a, 35b, and 35c) corresponding to the respective recognition apparatuses themselves by transmitting and receiving millimeter wave radar at a constant sampling rate. Therefore, the second data may include not only information specifying positions of the recognized objects in seconds, but also information specifying the positions of the recognized objects in finer time units (for example, in time units of less than one second).

Step S3: The controller 11 acquires a movement history indicating a temporal change in the position of a certain unspecific person 80 by analyzing the results of recognition by the recognition apparatuses 30 (30a, 30b, and 30c).

Specifically, the controller 11 performs a movement history acquisition process (steps S11 to S16) illustrated in FIG. 8 for samples of the second data at times after the time at which the specification apparatus 20 has specified the person, which is included in the result of specification acquired in step S1.

Step S11: The controller 11 refers to the second data and determines a position (first position) and velocity vector (first velocity vector) of the unspecific person (first unspecific person) 80 at a time (first time) at which a certain recognition apparatus (first recognition apparatus, for example, the recognition apparatus 30c) has recognized the first unspecific person 80, by analyzing a result of recognition by the recognition apparatus 30c.

Specifically, the controller 11 may extract multiple samples of the second data that are considered to be data of the same person and determine the first velocity vector based on a change in position in the extracted second data per unit time. The velocity vector is a vector indicating the amount and direction of movement of a target person in the XY directions per unit time. The controller 11 may, for example, extract the second data on an unspecific person to which the same object ID is assigned by the same recognition apparatus 30, as the second data on the same person. In a case in which the second data contains no object ID, the controller 11 may, for example, extract multiple samples of the second data on unspecific persons recognized by the same recognition apparatus 30, in which a difference in time and position is equal to or less than a predetermined threshold, as the second data on the same person. The threshold for the difference in time and position may be determined based on, for example, a movement speed of a normal pedestrian. Specifically, the controller 11 may, for example, extract multiple samples of the second data in which a movement distance for less than one second is within a few meters, as the second data of the same person. The controller 11 may determine the first velocity vector of the first unspecific person 80 based on the position and time of the first unspecific person 80 indicated by the extracted multiple samples of the second data.

In a case in which the second data stored in the second memory apparatus 60 includes information other than the position and time recognized for the unspecific person, the controller 31 may use the information in determining the first velocity vector. For example, in a case in which the second data includes information such as the identification information on the recognition apparatus 30 and the object ID, as described above, the controller 11 may use the information to determine the identification of the unspecific person and determine the first velocity vector. Alternatively, for example, in a case in which the second data includes a velocity vector calculated by the recognition apparatus 30 (30a, 30b, or 30c), the controller 11 may determine the velocity vector as the first velocity vector. Thus, in a case in which the second data includes the information other than the position and time recognized for the unspecific person, the first velocity vector for the unspecific person can be determined more accurately by using the information.

Instead of determining the first velocity vector for each of the samples of the second data acquired at the constant sampling rate, the controller 11 may determine the first velocity vector for the sample that is typical of the second data acquired successively for the same person recognized by the same recognition apparatus 30. For example, the controller 11 may determine the first velocity vector for each of the samples at a fixed time interval (for example, 10 seconds) in the second data acquired successively for the same person.

FIG. 12 illustrates an example of velocity vectors determined based on the second data. In the example in FIG. 12, the velocity vector is determined for each of the samples of the second data illustrated in FIG. 11. The velocity vector may be expressed by the amounts and directions of movement in X and Y directions during a unit of time. The direction of movement may be indicated by positive or negative. The following is an example in which the unit time is one minute, and the velocity vector is represented by a two-dimensional vector. For example, the velocity vector of an unspecific person recognized at a position (60,60) at a time 14:50:00 is (60,0). This velocity vector indicates that the unspecific person moves 60 m in the X-positive direction, i.e., to the right in FIG. 6, during one minute. For example, the velocity vector of an unspecific person recognized at a position (120,140) at a time 14:50:40 is (0,−70). This velocity vector indicates that the unspecific person moves by 70 m in the Y negative direction, i.e., upward in FIG. 6, during one minute.

Step S12: The controller 11 determines an estimated position of the first unspecific person 80 at a past time prior to the first time, based on the first time, the first position, and the first velocity vector determined in step S11.

Specifically, the controller 11 may determine the estimated position at each of times that are included in the samples of the second data whose first vectors are determined and that are within a certain period of time (for example, one minute) from and before the first time. For example, in step 11, suppose that a time 14:52:00, a position (120,120), and a velocity vector (0,60) are determined as the first time, the first position, and the first velocity vector, respectively (see FIG. 12). In this case, the first unspecific person 80 is estimated to move by 60 m in the Y positive direction (downward in FIG. 6) during one minute. Therefore, the controller 11 determines an estimated position at a time 14:51:30 to be (120,90) and an estimated position at a time 14:51:00 to be (120,60). In this way, the controller 11 determines the estimated position for each of the past times within the certain period of time from the first time.

Step S13: The controller 11 refers to the second data and determines a time (second time) at which a certain recognition apparatus (second recognition apparatus, for example, the recognition apparatus 30*b*) has recognized an unspecific person (second unspecific person) and a position (second position) of the second unspecific person at the second time, by analyzing the result of recognition by the second recognition apparatus 30*b*.

Specifically, the controller 11 may determine each of times that are included in the samples of the second data and that are the same as the past times determined in step S12, as a second time, and determine a position of an unspecific person at the time, as a second position. For example, in the case of setting a time 14:51:30, which is determined as the past time in step S12, as a second time, the controller 11 determines a position (50,60) at that time as a second position (see FIG. 12). In the case of setting a time 14:51:00 as a second time, a position (120,60) at that time is determined as a second position.

Step S14: The controller 11 determines whether the first unspecific person 80 and the second unspecific person are identical, based on a comparison of the past time and the estimated position for the first unspecific person 80 determined in step S12 with the second time and the second position for the second unspecific person determined in step S13.

Specifically, the controller 11 may determine that the first unspecific person 80 and the second unspecific person are identical in a case in which the distance between the second position corresponding to the second time, which is the same as the past time determined in step S12, and the estimated position is within a predetermined threshold. For example, the threshold to determine the identification of the unspecific person may be 3 m. In step S12, suppose that the controller 11 has determined the estimated position (120,90) at the past time 14:51:30 for the first unspecific person 80, based on the first position (120,120) and the first velocity vector (0,60) at the first time 14:52:00. For example, in step S13, suppose that the controller 11 has determined a second position (50,60) (velocity vector (−90,0)) at the second time 14:51:30 for the second unspecific person. In this case, the distance between the second position (50,60) corresponding to the second time, which is the same as the past time, and the estimated position (120,90) is $((120-50)2+(90-60)2)1/2=76.16$ m, which exceeds the threshold 3 m. Therefore, the controller 11 determines that the first unspecific person 80 and the second unspecific person are not identical. On the other hand, in step S12, suppose that the controller 11 has determined the estimated position (120,60) at the past time 14:51:00 for the first unspecific person 80. For example, in step S13, suppose that the controller 11 has determined a second position (120,60) (velocity vector (60,0)) at the second time 14:51:00 for the second unspecific person. In this case, the distance between the second position (120,60) corresponding to the second time, which is the same as the past time, and the estimated position (120,60) is 0 (<threshold 3 m). Therefore, the controller 11 determines that the first unspecific person 80 and the second unspecific person are identical. Thus, for each of the past times determined in step S12, the controller 11 may determine whether the first unspecific person 80 and the second unspecific person are identical by a comparison between the estimated position and the second position at the second time, which is the same as the past time.

Step S15: The controller 11 proceeds to step S16 in a case in which it is determined in step S14 that the first unspecific person 80 and the second unspecific person are identical (YES in step S15), otherwise (NO in step S15), the controller 11 ends the movement history acquisition process.

Specifically, the controller 11 may proceed to step S16 in a case in which it is determined in step S14 that the first unspecific person 80 and the second unspecific person are identical for at least one of the multiple past times.

Step S16: The controller 11 adds the second time and second position of the second unspecific person who is determined to be identical to the first unspecific person 80, to the movement history of the first unspecific person 80.

Specifically, for example, the first unspecific person 80 who is at the position (120,120) at the time 14:52:00 is determined to be identical to the second unspecific person who is at the position (120,60) at the time 14:51:00. Therefore, the controller 11 adds the second time 14:51:00 and the second position (120,60) to the movement history of the first unspecific person 80.

The controller 11 repeats processing of steps S11 to S16 backward from a reference time, for each of the samples of the second data at times after the time acquired in step S1, at which the specification apparatus 20 has specified a person, with the time of the sample as the first time in step S11, so that the movement history of the unspecific person 80 may be acquired. The reference time may be, for example, the time at which a request to start processing is received from a user, or the time at which the unspecific person 80 to be specified is recognized by a certain recognition apparatus (for example, the recognition apparatus 30*c*). The movement history acquisition process described above can generate the movement history of the unspecific person 80 by mapping the samples contained in the second data to the same unspecific person 80.

In a case in which the second data includes information such as the identification information on the recognition apparatus 30 and the object ID, the controller 11 may use the information to generate the movement history of the first unspecific person 80. For example, the controller 11 may extract a series of samples of the second data acquired sequentially for the same person recognized by the same recognition apparatus 30 as the person's movement history.

FIG. 13 illustrates an example of the movement history extracted from the results of recognition by the recognition apparatuses 30 according to the procedure described above.

In the example in FIG. 13, the unspecific person 80 is at a position (60,60) at a time 14:50:00, passes through a position (120,60) at a time 14:51:00, and reaches a position (120,120) at a time 14:52:00. After generating the movement history, the controller 11 ends the movement history acquisition process and proceeds to step S4 in FIG. 7.

Step S4: The controller 11 determines whether the specific person and the first unspecific person 80 are identical, based on the time and predetermined position 25 at which the specification apparatus 20 has specified the specific person and the movement history of the first unspecific person 80 acquired in step S3.

Specifically, the controller 11 performs an identity determination process (steps S21 to S23) illustrated in FIG. 9.

Step S21: The controller 11 acquires the first time and the first position included in the movement history of the first unspecific person 80 to be specified.

Specifically, the controller 11 acquires at least one pair of time and position included in the movement history of the unspecific person 80 acquired in step S3. For example, the controller 11 acquires one or more pairs of time and position included in the movement history illustrated in FIG. 13.

Step S22: The controller 11 acquires the time (specific time) and predetermined position 25 at which the specific person has been specified, based on the result of specification by the specification apparatus 20.

Specifically, for example, the controller 11 acquires at least one pair of the time and position at which the person has been specified, as illustrated in FIG. 10.

Step S23: The controller 11 determines the identification of the first unspecific person 80 and the specific person by a comparison of the first time and first position acquired in step S21 with the specific time and predetermined position 25 acquired in step S22.

Specifically, the controller 11 determines whether there is a match between at least one of the pairs of time and position included in the movement history acquired in step S21 and at least one of the pairs of specific time and predetermined position 25 acquired in step S22. Here, the controller 11 may determine that even though the time and the position included in the movement history are not exactly the same as the specific time and the predetermined position 25, the time and the position included in the movement history match with the specific time and the predetermined position 25 as long as a difference therebetween is within a predetermined threshold (for example, 5 seconds for time, distance of 5 m for position). In a case in which there is a match therebetween, the controller 11 determines that the first unspecific person 80 is identical to the specific person according to the specific time and the predetermined position 25 that match the movement history. In a case in which there is no match therebetween, the controller 11 determines that the first unspecific person 80 is not identical to the specific person.

In the examples in FIGS. 10 and 13, the time 14:50:00 and position (60,60) in the movement history in FIG. 13 and the specific time 14:50:00 and predetermined position 25 (60, 60) in FIG. 10 are identical and match with each other. Therefore, the controller 11 determines that the unspecific person 80 with the movement history in FIG. 13 is identical to the specific person "user A" in FIG. 10. After completing processing in step S23, the controller 11 ends the identity determination process and proceeds to step S5 in FIG. 7.

Step S5: The controller 11 proceeds to step S6 in a case in which it is determined that the first unspecific person 80 and the specific person are identical (YES in step S5) as a result of the identification determination process in step S4, otherwise (NO in step S5), the controller 11 proceeds to step S7.

Step S6: The controller 11 outputs the movement history of the first unspecific person 80 acquired in step S3 in association with the specific person determined to be identical in step S4.

For example, in the above example, the controller 11 associates the movement history in FIG. 13 with the "user A" and outputs an image indicating the correspondence relationship on a display of the output interface 14. For example, the controller 11 may output, to the display, an image indicating the correspondence relationship between the movement history of the unspecific person 80 and the identification information on the specific person on a map. The controller 11 may output the correspondence relationship between the movement history and the identification information on the specific person together with another signal such as sound as well as the image. The controller 11 may also output data indicating the correspondence relationship to a memory apparatus such as the memory 12 for storage. The controller 11 then ends processing of the flowcharts.

Step S7: The controller 11 associates the movement history of the first unspecific person 80 with a photographic image of the first unspecific person 80 and outputs an image indicating the correspondence relationship on the display of the output interface 14.

Specifically, the controller 11 acquires a photographic image in which the first unspecific person 80 is imaged. For example, the controller 11 may acquire a photographic image captured by the imaging apparatus 40 at the time and position included in the movement history of the first unspecific person 80. Alternatively, the controller 11 may acquire a specific photographic image specified by the user as the photographic image in which the first unspecific person 80 is imaged. The controller 11 associates the photographic image acquired in this manner with the movement history of the first unspecific person 80 and outputs an image indicating the correspondence relationship on the display of the output interface 14. For example, the controller 11 may output, to the display, an image indicating the correspondence relationship between the movement history of the unspecific person 80 and the photographic image on a map. The controller 11 may output the correspondence relationship between the movement history and the photographic image together with another signal such as sound as well as the image. The controller 11 may also output data indicating the correspondence relationship to a memory apparatus such as the memory 12 for storage. The controller 11 then ends processing of the flowcharts.

As described above, the information processing system 1 according to the present embodiment includes the specification apparatus 20, the at least one recognition apparatus 30, the first memory apparatus 50, the second memory apparatus 60, and the information processing apparatus 10. The specification apparatus 20 specifies a person present at a predetermined position as a specific person. The at least one recognition apparatus 30 recognizes a person present in a geographic range corresponding to the respective recognition apparatus as an unspecific person. The first memory apparatus 50 stores first data including a time and predetermined position at which the specification apparatus 20 has specified the specific person. The second memory apparatus 60 stores second data including a result of recognition by the at least one recognition apparatus 30. The information processing apparatus 10 acquires the first data from the first memory apparatus 50 and the second data from the second memory apparatus 60. The information processing apparatus 10 acquires a movement history indicating a temporal change in the position of a first unspecific person 80 by analyzing the second data. The information processing apparatus 10 determines whether the specific person and the first unspecific person 80 are identical, based on the first data and the movement history of the first unspecific person 80. In a case in which the specific person and the first unspecific person 80 are determined to be identical, the information processing apparatus 10 outputs the movement history of the first unspecific person as a movement history of the specific person.

Thus, the information processing system 1 according to the present embodiment stores the first data including a person's identification information and the second data including a pair of time and position of an unspecific person in the separate memory apparatuses. Therefore, even if a malicious third party illegally acquires either the first data or the second data, the movement history of the specific person cannot be acquired, thus protecting that person's privacy. In addition, in the information processing system 1, in a case in which the specific person and the first unspecific person 80 are determined to be identical, the information processing apparatus 10 outputs the movement history of the first unspecific person as the movement history of the specific person, so that a user can easily grasp the correspondence relationship between the movement history and the specific person. Also, the specific person and the movement history are associated with each other based on the result of specification by the specification apparatus 20 and the movement history of the unspecific person 80 based on the result of recognition by the at least one recognition apparatus 30, so it is possible to specify the unspecific person 80 recognized by the recognition apparatus 30. In addition, the use of the at least one recognition apparatus 30 allows acquisition of the movement history over a wide geographic area. The number of the expensive specification apparatus 20 can be reduced, so cost can be lowered. Furthermore, an individual cannot be specified only from the result of recognition by the recognition apparatus 30, so even if the result of recognition leaks, it is possible to protect the privacy of the unspecific person 80 recognized by the recognition apparatus 30. The recognition apparatus 30 can be realized by any configuration, e.g. by an inexpensive apparatus such as radar, as long as the recognition apparatus 30 can acquire information on at least the position and time of the unspecific person 80.

In the information processing system 1, the one or more recognition apparatuses 30 may include a first recognition apparatus (for example, recognition apparatus 30c). The second data may include at least one pair of a time at which the unspecific person has been recognized and a position at which the unspecific person has been present at that time. The information processing apparatus 10 may determine, by analyzing the second data, a first position and a first velocity vector of the first unspecific person 80 at a first time at which a first recognition apparatus has recognized the first unspecific person 80. The information processing apparatus 10 may determine an estimated position of the first unspecific person 80 at a past time prior to the first time, based on the first time, the first position, and the first velocity vector.

According to this configuration, the movement history of the first unspecific person 80 can be acquired with high accuracy by acquiring the estimated position of the first unspecific person 80 at the past time based on the time, position, and velocity vector of the first unspecific person 80.

In the information processing system 1, in a case in which the second data includes a pair of the past time and estimated position of the first unspecific person 80, the information processing apparatus 10 may extract the pair from the second data as a part of the movement history of the first unspecific person.

According to this configuration, the movement history of the first unspecific person 80 can be extracted with high accuracy by extracting the movement history based on the coincidence of past times and estimated positions.

In the information processing system 1, the information processing apparatus 10 may determine that the specific person and the first unspecific person 80 are identical, in a case in which a pair of the time and predetermined position at which the specification apparatus 20 has specified the specific person coincides with a pair of the past time and estimated position.

According to this configuration, the identification of the specific person and the first unspecific person 80 can be determined based on the coincidence between the pair of the time and predetermined position 25 at which the specification apparatus 20 has specified the specific person and the pair of the past time and estimated position for the first unspecific person 80, thus allowing specification of the first unspecific person 80 with high accuracy.

In the information processing system 1, the information processing apparatus 10 may determine that the specific person and the first unspecific person 80 are identical, in a case in which the pair of the time and predetermined position at which the specification apparatus 20 has specified the specific person coincides with a pair of the first time and first position for the first unspecific person 80.

According to this configuration, the identification between the specific person and the first unspecific person 80 can be determined based on the coincidence between the pair of the time and predetermined position 25 at which the specification apparatus 20 has specified the specific person and the pair of the first time and first position for the first unspecific person 80, thus allowing specification of the first unspecific person 80 with high accuracy.

In the information processing system 1, the information processing apparatus 10 may determine whether the specific person and the first unspecific person are identical upon a request from an apparatus associated with the specific person.

According to this configuration, the identification between the specific person and the first unspecific person 80 is determined only upon the request from the apparatus associated with the specific person, so the privacy of the specific person can be more appropriately protected.

In the information processing system 1, the second data may be data acquired by an apparatus including millimeter wave radar or an infrared sensor.

In general, the millimeter wave radar or infrared sensor can be configured less expensively than the specification apparatus 20 for specifying a person. Therefore, by realizing the at least one recognition apparatus 30 by the millimeter wave radar or infrared sensor, the information processing system 1 can be inexpensively configured.

In the information processing system 1, the at least one recognition apparatus 30 may include two or more recognition apparatuses 30 arranged such that at least a part of the corresponding geographic ranges 35 overlap each other.

For example, in FIG. 6, the geographic range 35a of the recognition apparatus 30a and the geographic range 35b of the recognition apparatus 30b overlap in part. Thus, overlapping at least a part of the corresponding geographic ranges 35 of the recognition apparatuses 30 allows the two or more recognition apparatuses 30 to seamlessly track and recognize the movement of the unspecific person 80 who moves the multiple geographic ranges 35 through the overlapping range. Thus, according to such a configuration, it is possible to track the movement history of the unspecific person 80 who moves across the geographic ranges 35 corresponding to the multiple recognition apparatuses 30 with high accuracy.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

For example, an embodiment in which the configuration and operations of the information processing apparatus 10 in the above embodiment are distributed to multiple computers capable of communicating with each other can be implemented. For example, an embodiment in which some or all of the components of the specification apparatus 20 and the recognition apparatuses 30 are provided in the information processing apparatus 10 can also be implemented. For example, the information processing apparatus 10 may be equipped with a component to acquire identification information of a person, which is provided by the specification apparatus 20.

The information processing apparatus 10 may also acquire a movement history of an unspecific person 80 upon selection of the unspecific person 80 by a user and in response to a request, specify a corresponding specific person, and control a memory apparatus to store the movement history in association with the specific person. According to this configuration, the movement history of the unspecific person 80 selected by the user can be automatically acquired and associated with the specific person.

The information processing apparatus 10 may also store a movement history once generated for a certain time range in the memory 12 or the like, and reuse the stored movement history in the case of generating another movement history for a time range adjacent to this time range. According to this configuration, once the movement history has been generated, there is no need to repeat the process of generating the same movement history, and the process can proceed efficiently.

In the example referring to FIG. 6, the specification of the person by the specification apparatus 20 precedes the recognition of the unspecific person 80 by the recognition apparatuses 30b and 30c, but the specification of the person by the specification apparatus 20 need not precede the recognition of the unspecific person 80 by the recognition apparatus 30. For example, the recognition of the unspecific person 80 by the recognition apparatus 30 may be followed by the specification of the person by the specification apparatus 20.

For example, an embodiment in which a general purpose computer functions as the information processing apparatus 10 according to the above embodiment can also be implemented. Specifically, a program in which processes for realizing the functions of the information processing apparatus 10 according to the above embodiment are written may be stored in a memory of a general purpose computer, and the program may be read and executed by a processor. Accordingly, the present disclosure can also be implemented as a program executable by a processor, or a non-transitory computer readable medium storing the program.

The invention claimed is:

1. An information processing system comprising:
a specification apparatus configured to specify a person present at a predetermined position as a specific person by receiving user identification data from a terminal in possession of the person or by reading the person's biological information;
at least one recognition apparatus comprising at least one millimeter wave radar and/or at least one infrared sensor, wherein the at least one recognition apparatus recognizes a person present in a geographic range corresponding to the respective recognition apparatus as an unspecific person via the at least one millimeter wave radar and/or the at least one infrared sensor;
a first memory apparatus comprising at least one first storage, wherein the first memory apparatus stores, in said at least one first storage. first data including a time and the predetermined position at which the specification apparatus has specified the specific person;
a second memory apparatus comprising at least one second storage, wherein the second memory apparatus stores, in said at least one second storage, second data including a result of recognition by the at least one recognition apparatus; and
an information processing apparatus said information processing apparatus comprising at least one physical processor and at least one communication interface;
wherein the at least one physical processor of the information processing apparatus;
acquires, via the at least one communication interface, the first data from the first memory apparatus and the second data from the second memory apparatus;
acquires a movement history indicating a temporal change in a position of a first unspecific person by analyzing the second data;
determines whether the specific person and the first unspecific person are identical, based on the first data and the movement history of the first unspecific person; and
outputs the movement history of the first unspecific person, as a movement history of the specific person, in a case in which the specific person and the first unspecific person are determined to be identical.

2. The information processing system according to claim 1, wherein
the at least one recognition apparatus includes a first recognition apparatus,
the second data includes at least one pair of a time at which the unspecific person has been recognized and a position at which the unspecific person is present at the time, and
the information processing apparatus is configured to:
determine, by analyzing the second data, a first position and a first velocity vector of the first unspecific person at a first time at which the first recognition apparatus has recognized the first unspecific person; and
determine, based on the first time, the first position, and the first velocity vector, an estimated position of the first unspecific person at a past time prior to the first time.

3. The information processing system according to claim 2, wherein in a case in which the second data includes a pair of the past time and the estimated position of the first unspecific person, the information processing apparatus extracts the pair from the second data as a part of the movement history of the first unspecific person.

4. The information processing system according to claim 2, wherein in a case in which a pair of the time and predetermined position at which the specification apparatus has specified the specific person coincides with a pair of the past time and estimated position of the first unspecific person, the information processing apparatus determines that the specific person and the first unspecific person are identical.

5. The information processing system according to claim 2, wherein in a case in which a pair of the time and predetermined position at which the specification apparatus has specified the specific person coincides with a pair of the first time and first position of the first unspecific person, the information processing apparatus determines that the specific person and the first unspecific person are identical.

6. The information processing system according to claim 1, wherein the information processing apparatus is configured to determine whether the specific person and the first unspecific person are identical upon a request from an apparatus associated with the specific person.

7. The information processing system according to claim 1, wherein the second data is data acquired by an apparatus including millimeter wave radar or an infrared sensor.

8. An information processing method of an information processing system including:
  a specification apparatus configured to specify a person present at a predetermined position as a specific person by receiving user identification data from a terminal in possession of the person or by reading the person's biological information;
  at least one recognition apparatus comprising at least one millimeter wave radar and/or at least one infrared sensor, wherein at least one recognition apparatus recognizes a person present in a geographic range corresponding to the respective recognition apparatus as an unspecific person via the at least one millimeter wave radar and/or the at least one infrared sensor;
  a first memory apparatus comprising at least one first storage, wherein the first memory apparatis stores, in said at least one first storage, first data including a time and the predetermined position at which the specification apparatus has specified the specific person;
  a second memory apparatus comprising at least one second storage, wherein the second memory apparatus siores, in said at least one second storage, second data including a result of recognition by the at least one recognition apparatus; and
  an information processing apparatus comprising at least one physical processor and at least one communication interface;
  wherein the at least one physical processor of the information processing apparatus is operable for:
    acquiring, via the at least one communication interface, the first data from the first memory apparatus and the second data from the second memory apparatus;
    acquiring a movement history indicating a temporal change in a position of a first unspecific person by analyzing the second data;
    determining whether the specific person and the first unspecific person are identical, based on the first data and the movement history of the first unspecific person; and
    outputting the movement history of the first unspecific person, as a movement history of the specific person, in a case in which the specific person and the first unspecific person are determined to be identical.

9. An non-transitory computer readable medium storing a program configured to cause a computer to execute operations as an information processing apparatus configured to communicate with a specification apparatus configured to specify a person present at a predetermined position as a specific person by receiving user identification data from a terminal to possession of the person or by reading the person's biological information, at least one recognition apparatus comprising at least one millimeter wave radar and/or at least one infrared sensor, wherein the at least one recognition apparatus recognizes a person present in a geographic range corresponding to the respective recognition apparatus as an unspecific person via the at least one millimeter wave radar and/or the at least one infrared sensor, a first memory apparatus comprising at least one first storage, wherein the first memory apparatus stores, in said at least one first storage, first data including a time and the predetermined position at which the specification apparatus has specified the specific person, and a second memory apparatus comprising at least one second storage, wherein the second memory apparatus stores, in said at least one second storage, second data including a result of recognition by the at least one recognition apparatus, the program operations comprising:
  acquiring the first data from the first memory apparatus and the second data from the second memory apparatus;
  acquiring a movement history indicating a temporal change in a position of a first unspecific person by analyzing the second data;
  determining whether the specific person and the first unspecific person are identical, based on the first data and the movement history of the first unspecific person; and
  outputting the movement history of the first unspecific person, as a movement history of the specific person, in a case in which the specific person and the first unspecific person are determined to be identical.

* * * * *